US010389145B2

(12) United States Patent
Islinger et al.

(10) Patent No.: US 10,389,145 B2
(45) Date of Patent: Aug. 20, 2019

(54) SYSTEM AND METHOD FOR REDUCING INTERFERENCE IN A WIRELESS POWER TRANSFER SYSTEM

(71) Applicant: WiTricity Corporation, Watertown, MA (US)

(72) Inventors: Simon Islinger, Munich (DE); Rafal Scibor, Munich (DE); Marcel Fischer, Boniswil (CH); Leandro Percebon, Munich (DE); Stefan Raabe, Unterhaching (DE); Martin Pavlovsky, Munich (DE); Jonas Friedel, Munich (DE)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 15/625,882

(22) Filed: Jun. 16, 2017

(65) Prior Publication Data
US 2018/0361863 A1 Dec. 20, 2018

(51) Int. Cl.
*H02J 7/00* (2006.01)
*H02J 7/02* (2016.01)
*B60L 53/12* (2019.01)
*B60L 53/30* (2019.01)
*B60L 53/31* (2019.01)
*H02J 50/12* (2016.01)
*H02J 50/80* (2016.01)

(52) U.S. Cl.
CPC ............ *H02J 7/0027* (2013.01); *B60L 53/12* (2019.02); *B60L 53/30* (2019.02); *B60L 53/31* (2019.02); *H02J 7/0042* (2013.01); *H02J 7/025* (2013.01); *H02J 50/12* (2016.02); *H02J 50/80* (2016.02)

(58) Field of Classification Search
USPC ........................................................ 320/108
See application file for complete search history.

(56) References Cited

U.S. PATENT DOCUMENTS

| 4,374,187 | A | * | 2/1983 | Sano | ...................... H01M 2/043 |
| | | | | | 429/175 |
| 7,867,643 | B2 | * | 1/2011 | Cho | ..................... H01M 2/0247 |
| | | | | | 429/158 |
| 8,551,639 | B2 | * | 10/2013 | Byun | .................. H01M 2/1083 |
| | | | | | 429/100 |
| 8,760,253 | B2 | | 6/2014 | Hickox | |

(Continued)

FOREIGN PATENT DOCUMENTS

WO WO-2006001557 A1 1/2006

*Primary Examiner* — Arun C Williams
(74) *Attorney, Agent, or Firm* — Knobbe, Martens, Olson & Bear, LLP

(57) ABSTRACT

One aspect of the disclosure provides an apparatus for conveying wireless power. The apparatus comprises a circuit board disposed along one or more planar coils and a plurality of feeds. The circuit board is divided into a first area separate from a second area. The first area has a plurality of first voltage components and the second area has a plurality of second voltage components. The first voltage components operates at a lower voltage than the second voltage components. The plurality of feeds are coupled to the one or more planar coils and the circuit board. The plurality of feeds pass through the circuit board within the second area along a side of the circuit board and couple to one or more of the second voltage components.

27 Claims, 10 Drawing Sheets

(56) References Cited

U.S. PATENT DOCUMENTS

| | | | |
|---|---|---|---|
| 9,178,369 B2 | 11/2015 | Partovi | |
| 9,247,373 B2 * | 1/2016 | Golsch | H04W 4/001 |
| 2005/0237691 A1 * | 10/2005 | Dayan | G06F 1/26 |
| | | | 361/119 |
| 2007/0182367 A1 * | 8/2007 | Partovi | H01F 5/003 |
| | | | 320/108 |
| 2009/0179501 A1 * | 7/2009 | Randall | H01R 25/147 |
| | | | 307/104 |
| 2014/0093765 A1 * | 4/2014 | Kusunoki | H01M 2/1072 |
| | | | 429/120 |
| 2014/0302363 A1 * | 10/2014 | Miyawaki | H01M 2/1077 |
| | | | 429/90 |
| 2015/0162753 A1 | 6/2015 | Werner et al. | |
| 2015/0170832 A1 | 6/2015 | Covic et al. | |
| 2016/0059725 A1 * | 3/2016 | Kim | H04B 5/0037 |
| | | | 320/108 |
| 2016/0064994 A1 * | 3/2016 | Ku | H02J 7/025 |
| | | | 307/104 |
| 2016/0087484 A1 * | 3/2016 | Kim | H02J 7/025 |
| | | | 320/101 |

* cited by examiner

SYSTEM AND METHOD FOR REDUCING INTERFERENCE IN A WIRELESS POWER TRANSFER SYSTEM

FIELD

The present disclosure relates generally to wireless power transfer, and more specifically to devices, systems, and methods related to wireless power transfer to remote systems such as vehicles or electronic devices including batteries. More particularly, this disclosure relates to systems and methods of reducing interference within and simplifying manufacturing of wireless power transfer pads used in the wireless power transfer.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desired.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for conveying wireless power. The apparatus comprises a circuit board disposed along one or more planar coils and a plurality of feeds. The circuit board is divided into a first area separate from a second area. The first area has a plurality of first voltage components and the second area has a plurality of second voltage components. The first voltage components operates at a lower voltage than the second voltage components. The plurality of feeds are coupled to the one or more planar coils and the circuit board. The plurality of feeds pass through the circuit board within the second area along a side of the circuit board and couple to one or more of the second voltage components.

Another aspect of the disclosure provides a method of manufacturing an apparatus for wirelessly conveying power. The method comprises providing a ferromagnetic structure disposed along a first side of one or more planar coils. The method also comprises providing a circuit board disposed along the ferromagnetic structure on a second side opposite the one or more planar coils. The method further comprises dividing the circuit board into a first area separate from a second area. The first area has an arrangement of first voltage components and the second area has an arrangement of second voltage components. The first voltage components operate at a lower voltage than the second voltage components. The method also further comprises providing a plurality of feeds coupled to the one or more planar coils and the circuit board without penetrating the ferromagnetic structure, wherein the plurality of feeds penetrate the circuit board within the second area and couple to one or more of the second voltage components.

An additional aspect of the disclosure comprises an apparatus for conveying wireless power. The apparatus comprises one or more means for conveying wireless power, means for supporting a circuit, and a plurality of means for conveying power. The means for supporting a circuit is disposed along the one or more means for conveying energy. The means for supporting a circuit is divided into a first area separate from a second area. The first area has a plurality of first voltage components and the second area has a plurality of second voltage components. The first voltage components operate at a lower voltage than the second voltage components. The plurality of means for conveying power is coupled to the one or more means for conveying power and the means for supporting a circuit. The plurality of means for conveying power passes through the means for supporting a circuit within the second area along a side of the means for supporting a circuit and couple to one or more of the second voltage components.

Figure 1:
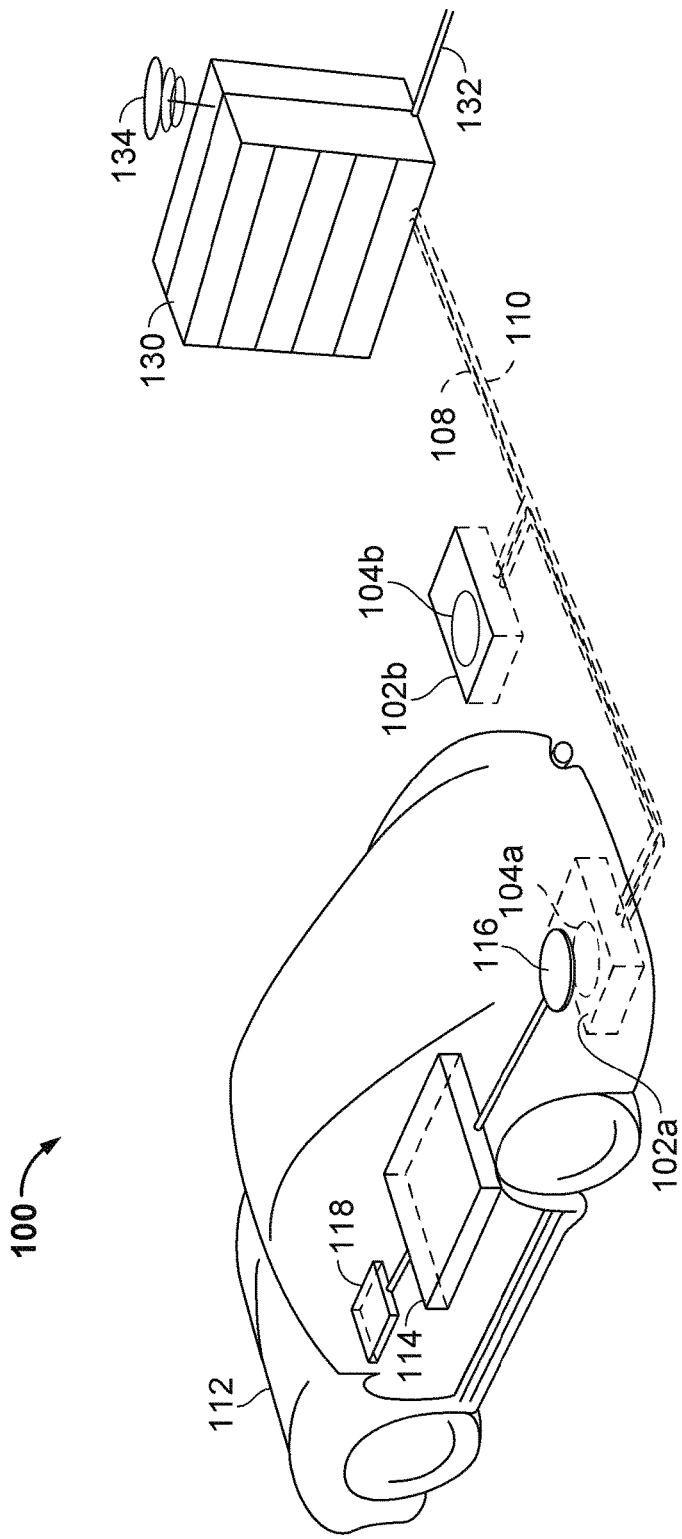
FIG. 1 is a diagram of an exemplary wireless power transfer system for charging an electric vehicle, in accordance with an exemplary embodiment of the present disclosure.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the present disclosure and is not intended to represent the only embodiments in which the present disclosure may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the present disclosure. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the present disclosure. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below.

Local distribution 130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
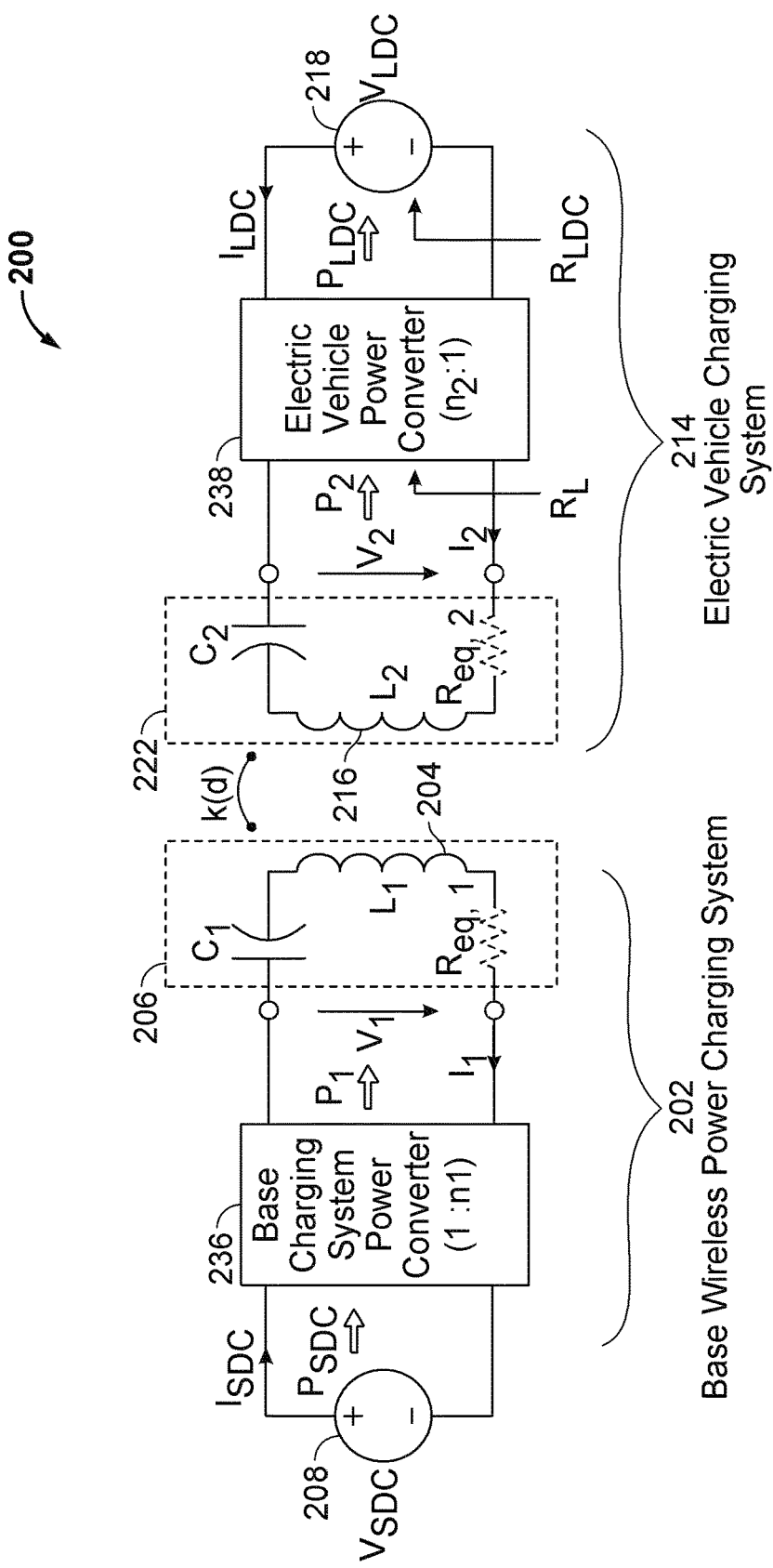
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non-limiting example, a capacitor may be placed in parallel between the two terminals of the induction coil (e.g., a parallel resonant circuit). Furthermore, an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
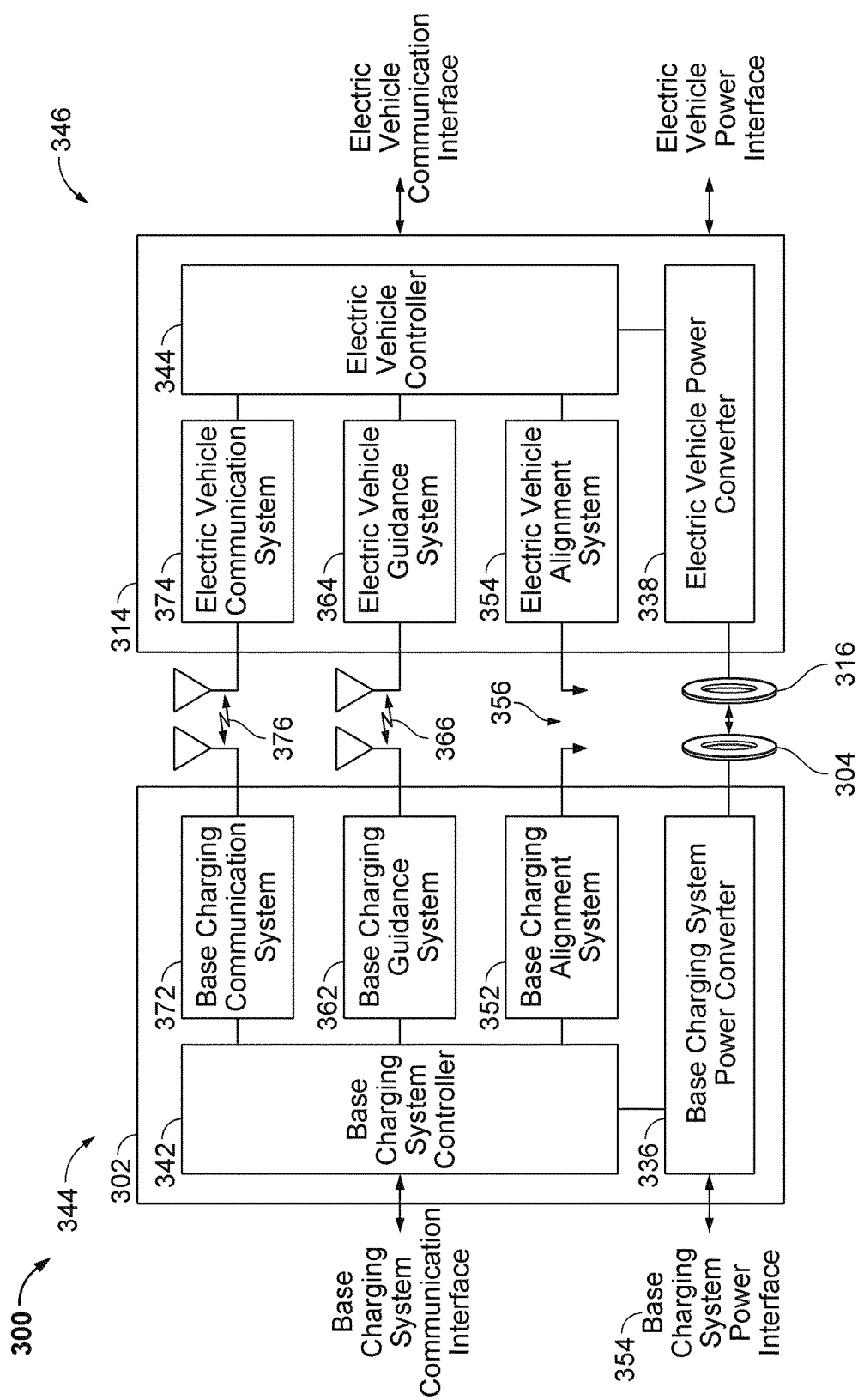
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 126. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, ZigBee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

Figure 4:
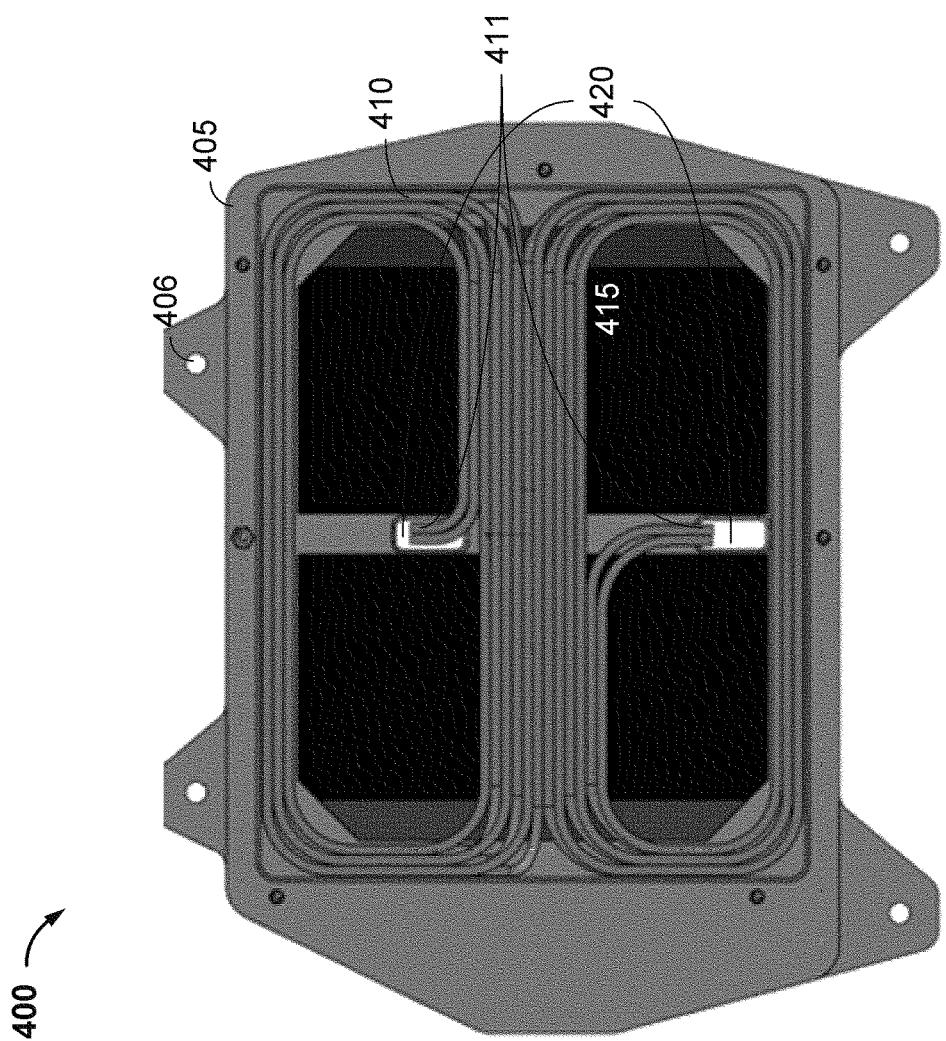
FIG. 4 is a top-down view of a wireless power transfer pad, in accordance with an exemplary embodiment of the present disclosure.

FIG. 4 is a top-down view of a wireless power transfer pad (pad) 400, in accordance with an exemplary embodiment of the present disclosure. The pad 400 includes a housing 405, coils 410, coil leads 411, and a ferromagnetic material 415 in two pieces. The various components of the pad 400 may be arranged to separate components relating to transfer of wireless power (e.g., the coils 410 and the ferromagnetic material 415) from components that control and convert the transferred wireless power (e.g., high voltage and low voltage electronics, not shown in this figure). The high voltage electronics may include components that handle high voltage signals (e.g., drivers, power converters, etc.), while the low voltage electronics may include components that handle low voltage signals (e.g., controllers, sensors, etc.). The two pieces of the ferromagnetic material 415 may be substantially coplanar and may be disposed on the housing 405 with a channel separating the two pieces. The coils 410 may be disposed on top of the ferromagnetic material 415 (e.g., on a side of the ferromagnetic material 415 opposite the housing 405. The coils 410 may comprise two adjacent and substantially coplanar "D" shaped coils (e.g., a double-D configuration) formed by two conductors disposed on the two pieces of the ferromagnetic material 415. The coils 410 include the coil leads 411. The coil leads 411 pass through a center of the pad 400 to the electronics. The housing 405 has two holes or orifices 420 disposed in the center of the housing 405 that pass through the housing 405 (e.g., penetrate through the housing 405 from a top surface to a bottom surface not shown in this figure). In passing through the center of the pad 400, the coil leads 411 pass through the channel separating the two pieces of the ferromagnetic substrate 415 and through the holes 420 of the housing 405. The electronics are disposed below the housing 405. The housing 405 also includes multiple mounts 406, which may comprise holes through portions of the housing 405.

In the wireless power transfer systems as described herein, the pad 400 may comprise either one or both of a wireless power transmitter and the wireless power receiver. When comprising the transmitter, the pad 400 may comprise the components of the base wireless charging system 102 of FIG. 1, the base wireless power charging system 202 of FIG. 2, and/or the base wireless charging system 302 of FIG. 3. When comprising the receiver, the pad 400 may comprise the components of the electric vehicle wireless charging system 114 of FIG. 1, the electric vehicle charging system 214 of FIG. 2, and/or the electric vehicle charging system 314 of FIG. 3.

The pad 400 described herein may receive power wirelessly from a wireless power transmitter (not shown in this figure). In some implementations, the pad 400 may transmit power wirelessly but be structurally and operationally similar to the pads 400 that receive power and may include many of the same benefits as described herein. Similarly, the pad 400 that both receives and transmits power wirelessly may also share the structure and operation described herein.

In some implementations, the receiving pad 400 may be exposed to a wireless field (not shown in this figure) generated by the transmitter. When exposed to the wireless field, the field may induce power in a form of a voltage signal in the coils 410, and a corresponding current generated in the coils 410 may flow through the coils 410. In some implementations, the wireless field may induce a high voltage signal in the coils 410. In some implementations, high voltages may include any voltage exceeding 50 volts (V) and commonly in the range of hundreds of volts. Low voltages may include any voltage less than or equal to 50 V. The coil leads 411 may convey the high voltage signal from the coils 410 to the electronics positioned within the housing 405. The housing 405 may house the electronics to protect them from environmental impacts and factors as well as to provide a structure to which the electronics may be mounted. In some implementations, the housing 405 may be constructed from a material that allows the housing 405 to also serve as a conductive shield for the electronics from effects of the wireless field. In some implementations, the housing 405 may be constructed from a non-conductive material. The housing 405 may be mounted to one or more external components or structures via the mounts 406. In some implementations, the mounts 406 may provide paths for screws, bolts, or other retaining members to hold the housing 405 in a fixed position or place.

In some implementations, the ferromagnetic substrate 415 may comprise a ferrite material and may enhance coupling of the coils 410 to the magnetic field and reduce eddy currents (e.g., heat dissipation) in the housing 405. In some implementations, the ferromagnetic substrate 415 may enhance coupling and prevent excessive eddy current losses in structural components of a device to which the pad 400 is attached (e.g., an electric vehicle's underbody or housing of an electronic device). With the coil leads 411 passing through the center of the ferromagnetic substrate 415 as shown in FIG. 4, the ferromagnetic substrate 415 may be separated into the two separate pieces shown to allow the path for the coil leads 411 to the holes 420 in the housing 405. Alternatively, or additionally, the ferromagnetic substrate 415 may comprise holes (not shown) to provide the path for the coil leads 411 to the holes 420 in the housing 405. Such arrangements of the ferromagnetic substrate 415 having separate pieces or having holes may increase manufacturing costs of the pad 400 by increasing processing and handling of the ferromagnetic substrate 415 as compared to a single, solid ferromagnetic substrate structure. For example, the arrangement of the pad 400 shown in FIG. 4 may utilize manufacturing and installation of the two separate ferromagnetic substrate pieces that form the ferromagnetic substrate 415, which may be undesirable.

Furthermore, because of the high permeability of the ferromagnetic substrate 415, the current flow through the coil leads 411 can generate significant or undesirable circumferential flux densities in the ferromagnetic substrate 415 surrounding the coil leads. These flux densities may significantly increase magnetic losses of the system. Accordingly, it is advantageous to reduce (e.g., prevent, avoid, minimize) such losses, which can also cause high temperature increases and thermal stresses to the pad 400.

The electronics may be configured to control and/or convert the high voltage signal received from the coils 410 via the coil leads 411. For example, the electronics may convert the high voltage signal to a lower voltage for use by the load or storage in a battery, etc. In some implementations, the electronics may control a flow of the high voltage signal received from the coils 410 to other high and/or low voltage components.

Figure 5:
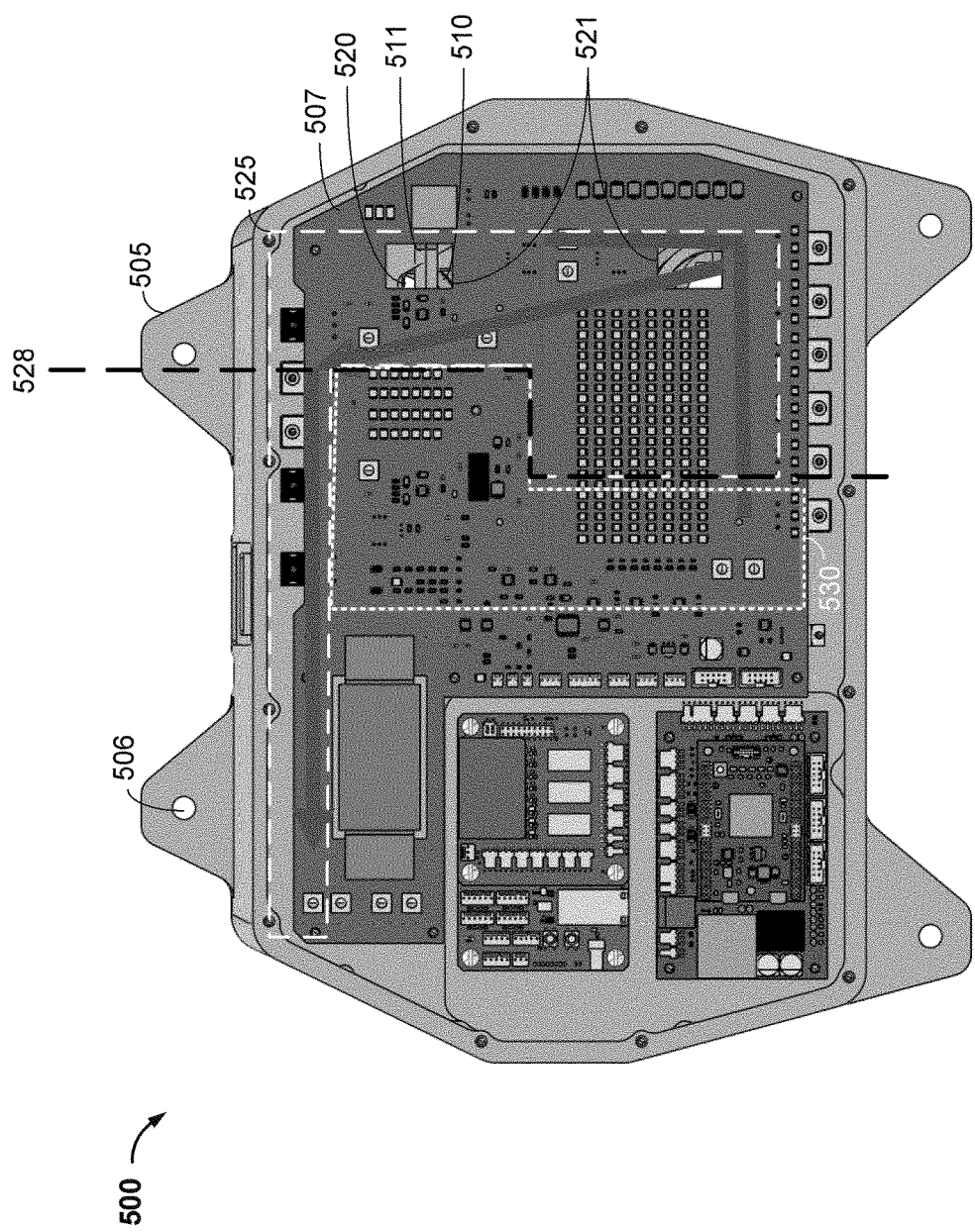
FIG. 5 is a bottom-up view of another wireless power transfer pad, in accordance with an exemplary embodiment of the present disclosure.

FIG. 5 is a bottom-up view of another wireless power transfer pad (pad) 500, in accordance with an exemplary embodiment of the present disclosure. The pad 500 includes coils 510, coil leads 511, a ferromagnetic substrate (not shown in this figure), a printed circuit board (PCB) 507 including various electronic components (electronics), and a housing 505. As described in relation to pad 400 of FIG. 4, the various components of the pad 500 may be arranged to separate components relating to transfer of wireless power (e.g., the coils 510 and the ferromagnetic substrate) from components that control and convert the transferred wireless power (e.g., the electronics shown on the PCB 507).

As shown in FIG. 5, the housing 505 houses the PCB 507. The PCB 507 may be coupled to the housing 505 via one or more attachment points (not shown). The PCB 507 may be divided into at least two regions by a separation line 528 (e.g., into at least one high voltage region 525 and at least one low voltage region 530). One or more high voltage components of the electronics may be disposed within the high voltage region 525. One or more low voltage components of the electronics may be disposed within the low voltage region 530. Accordingly, in the pad 500, one or more low voltage components may be disposed in a center of the PCB 507, while the high voltage components may be disposed along a right edge or side of the PCB 507. In some implementations, the high voltage region 525 may include holes 521, which are shown along the right side of the PCB 507 and pass through the PCB 507 (e.g., penetrate through the PCB 507 from a top surface to a bottom surface).

The electronics may be configured to control and/or convert the high voltage signal received from the coils 510 via the coil leads 511. For example, the electronics may convert the high voltage signal to a lower voltage for use by the load or storage in a battery, etc. In some implementations, the electronics may control a flow of the high voltage signal received from the coils 510 to other high and/or low voltage components. In some implementations, examples of the high voltage components may comprise inductors, current sensors, diodes, and switches, among others. In some implementations, an example of the low voltage components may comprise a thermal sensor and a processor, among others.

As noted herein, the pad 500 may be used in either or both of wirelessly receiving and wirelessly transmitting power. The pad 500 shows the PCB 507 having coil leads 511 from coils of the pad 500 penetrating the PCB 507 through the two holes 521 located within the high voltage region 525 of the PCB 507. Accordingly, the coil leads 511 may convey the high voltage signals induced in the coils to the electronics of the PCB 507, similar to the coil 410, the coil leads 411, and the electronics of the pad 400 of FIG. 4. The PCB 507 may be coupled to or attached to the housing 505, which may correspond to the housing 405 of FIG. 4. Accordingly, in some implementations, the mounts 506 may provide paths for screws, bolts, or other retaining members to hold the housing 505 in a fixed position or place.

The holes 521 are positioned at a location along the right sides or edges of the housing 505 and the PCB 507, respectively (and thus, along the right side of the pad 500). Because the coil leads 511 that pass through the holes 521 convey high voltage signals, the holes 521 may be positioned such that the coil leads 511 pass through the PCB 507 (via the holes 521) and couple to the high voltage components within a high voltage region 525. In some implementations, the holes 521 may be positioned within the high voltage region 525 and the coil leads 511 may couple to one or more of the high voltage components. The high voltage region 525 may be positioned as far away as possible from a low voltage region 530 that contains the low voltage components. The separation of the low voltage region 530 and the high voltage region 525, and specifically the placement of the high voltage region 530 along the edge of the pad 500, may provide benefits over the arrangement of the pad 400, as discussed in more detail below.

In some implementations, the electronics of the PCB 507 are arranged to isolate the low voltage components within the low voltage region 530 from the high voltage components within the high voltage region 525, separated by the separation line 528. In some implementations, the low voltage region 530 and the high voltage region 525 may be separated by as much distance as possible on the PCB 507. Placement of the low voltage components within the low voltage region 530 and the high voltage components within the high voltage region 525 may provide for corresponding voltage flows to be routed and contained within the low and high voltage regions 530 and 525, respectively.

Contrary to the arrangement of the electronics in the pad 400, the arrangement in the pad 500 includes positioning the high voltage region 525 along the right and top edges of the PCB 507. Such an arrangement of the high voltage region 525 generally leaves areas for the low voltage region 530 in the center of the PCB 507 and along a left and bottom edges of the PCB 507. Placing the low voltage components in areas separate from the high voltage components may reduce a likelihood of the low voltage components being affected by interference from the high voltage components or the high voltage signals being handled by the high voltage components. The reduced likelihood may be compared to arrangements where the high and low voltage components are arranged in an intermixed or less separated arrangement, such as the pad 400 in FIG. 4. In the pad 400, the coil leads 411 penetrate the housing 405 (and assumedly a corresponding printed circuit board) through substantially the center of the housing 405. The corresponding low voltage and high voltage regions (not shown) may be arranged in closer proximity than in the pad 500 because the coil leads 411 penetrate the center of the PCB, which may not be far from any other area of the PCB. Thus, by penetrating the PCB in the center in the pad 400, the arrangement of high and low voltage regions cannot be separated as seen in the pad 500. Therefore, in the pad 400, the low voltage components may be more susceptible to interference from the high voltage components than in the pad 500.

Alternatively, or additionally, the high voltage region 525 may be placed along any other edge or combination of edges of the PCB 507 with the low voltage region 530 being place along an opposite edge (or center) of the PCB 507 from the high voltage region 525. As discussed herein, the separate positions of the low voltage and high voltage components and separated voltage flows may reduce interference experienced by the low voltage components caused by the high voltage components.

Additionally, positioning the holes 521 along the edges of the PCB 507 may remove the holes (e.g., the holes 420 of FIG. 4) from the center of the circuit board 507. This may provide additional real estate on the PCB 507 for wire traces for the electronics of the PCB 507. As the center of the PCB 507 is generally a concentrated area for the wire traces, reducing obstructions in this area of the PCB 507 may greatly simplify circuit board design and reduce circuit board manufacturing costs.

Figure 6:
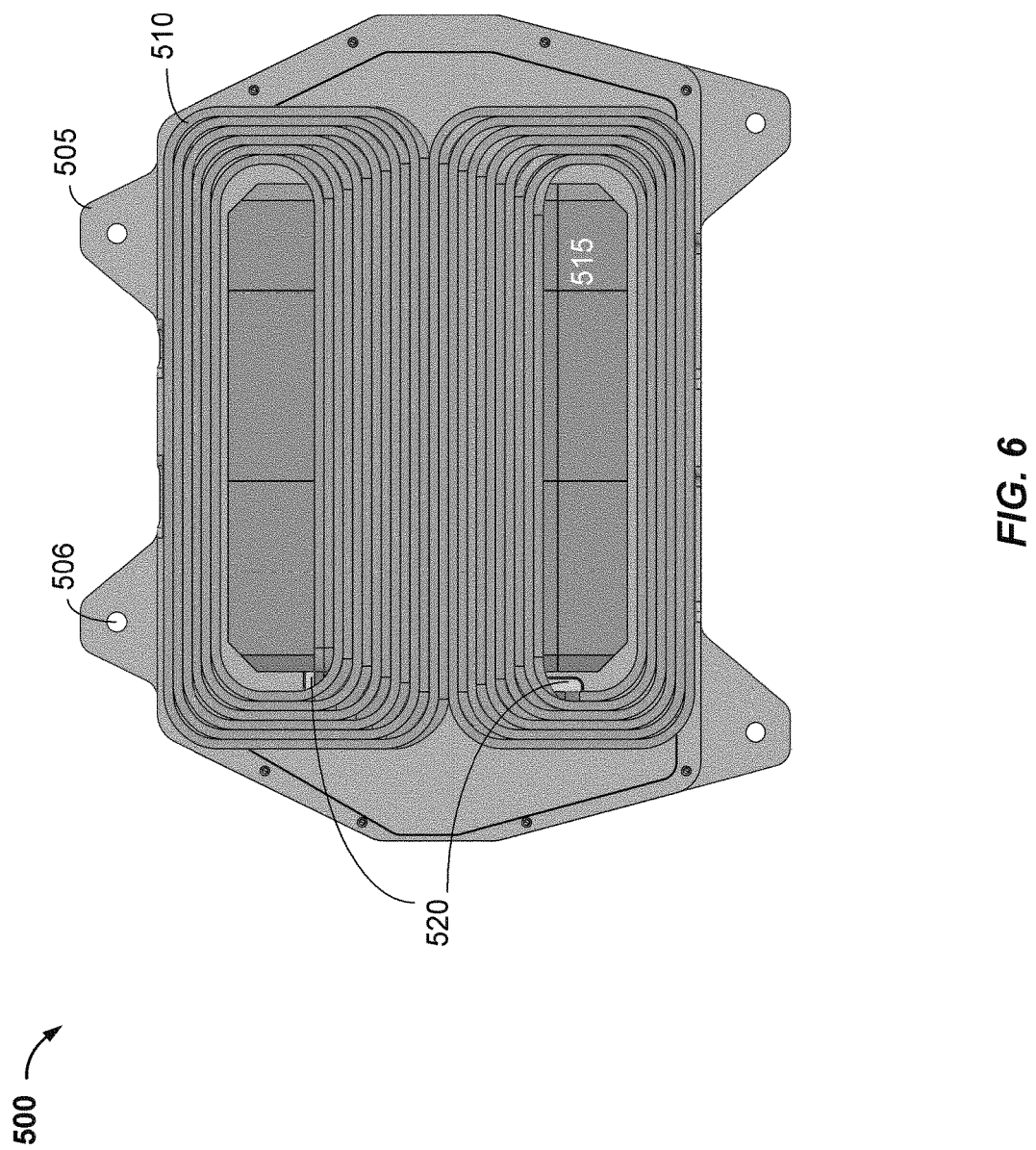
FIG. 6 is a top-down perspective view of the pad of FIG. 5, in accordance with an exemplary embodiment of the present disclosure.

FIG. 6 is a top-down perspective view of the pad 500 of FIG. 5, in accordance with an exemplary embodiment of the present disclosure. The pad 500 includes the housing 505, coils 510, coil leads 511, and a ferromagnetic material 515. Various components of the pad 500 may be arranged to separate components relating to transfer of wireless power (e.g., the coils 510 and the ferromagnetic material 515) from components that control and convert the transferred wireless power (e.g., electronics on the PCB 507, as shown in FIG. 5). The ferromagnetic material 515 may be disposed on the housing 505. The coils 510 may be disposed on top of the ferromagnetic material 515. The coils 510 may comprise two adjacent and substantially coplanar "D" shaped coils (e.g., a double-D configuration) formed by two conductors disposed on the ferromagnetic material 515. The coils 510 include the coil leads 511. The coil leads 511 pass through an edge of the pad 500 to the PCB 507 of FIG. 5. The housing 505 has the two holes or orifices 520 disposed along the edge of the housing 505 that pass through the housing 505 (e.g., penetrate through the housing 505 from a top surface to a bottom surface). In passing through the edge of the pad 500, the coil leads 511 do not pass through the ferromagnetic substrate 515. The electronics, as shown in FIG. 5, are disposed below the housing 505. The housing 505 also includes multiple mounts 506, which may comprise holes through portions of the housing 505.

The arrangement of the pad 500 as described herein is different from an arrangement of the pad 400 of FIG. 4. In the pad 400, the coil leads 411 may pass along the center of the pad 400, as opposed to along the edge of the pad 500 in FIG. 5. In coupling the coils 410 to the electronics in the housing 405, the coil leads 411 may pass through the ferrite substrate 415 and the housing 405. However, in the pad 500, the coil leads 511 may not pass through the ferromagnetic substrate. By not passing the coil leads 511 through the ferromagnetic substrate, holes in the ferromagnetic substrate and/or the path for the coil leads 511 between two separate pieces of the ferromagnetic substrate (as seen in the pad 400) are eliminated. Accordingly, the potential losses due to circumferential flux densities in the ferromagnetic substrate 415 surrounding the coil leads 411 (e.g., when passing through the ferromagnetic substrate 415) may be eliminated in the pad 500. Accordingly, the pad 500 may not experience the high temperature increases and thermal stresses associated with the circumferential flux densities.

Furthermore, by utilizing the single ferromagnetic substrate 515, the material and manufacturing costs of the ferromagnetic substrate 515 and, thus, the pad 500 can be further decreased. In some implementations, by separating the low and high voltage regions 530 and 525, respectively, maintenance of the pad 500 may be improved or simplified. For example, separating the low and high voltage components 530 and 525, respectively, may make maintenance safer by reducing a potential of accidental exposure to the high voltage signals of the high voltage components when not contained only within the high voltage region 525. Additionally, by passing the coil leads 511 along one of the edges of the pad 500, access to the coil leads 511 may be improved and removal and/or maintenance of the coils 510 may be correspondingly simplified.

Figure 7:
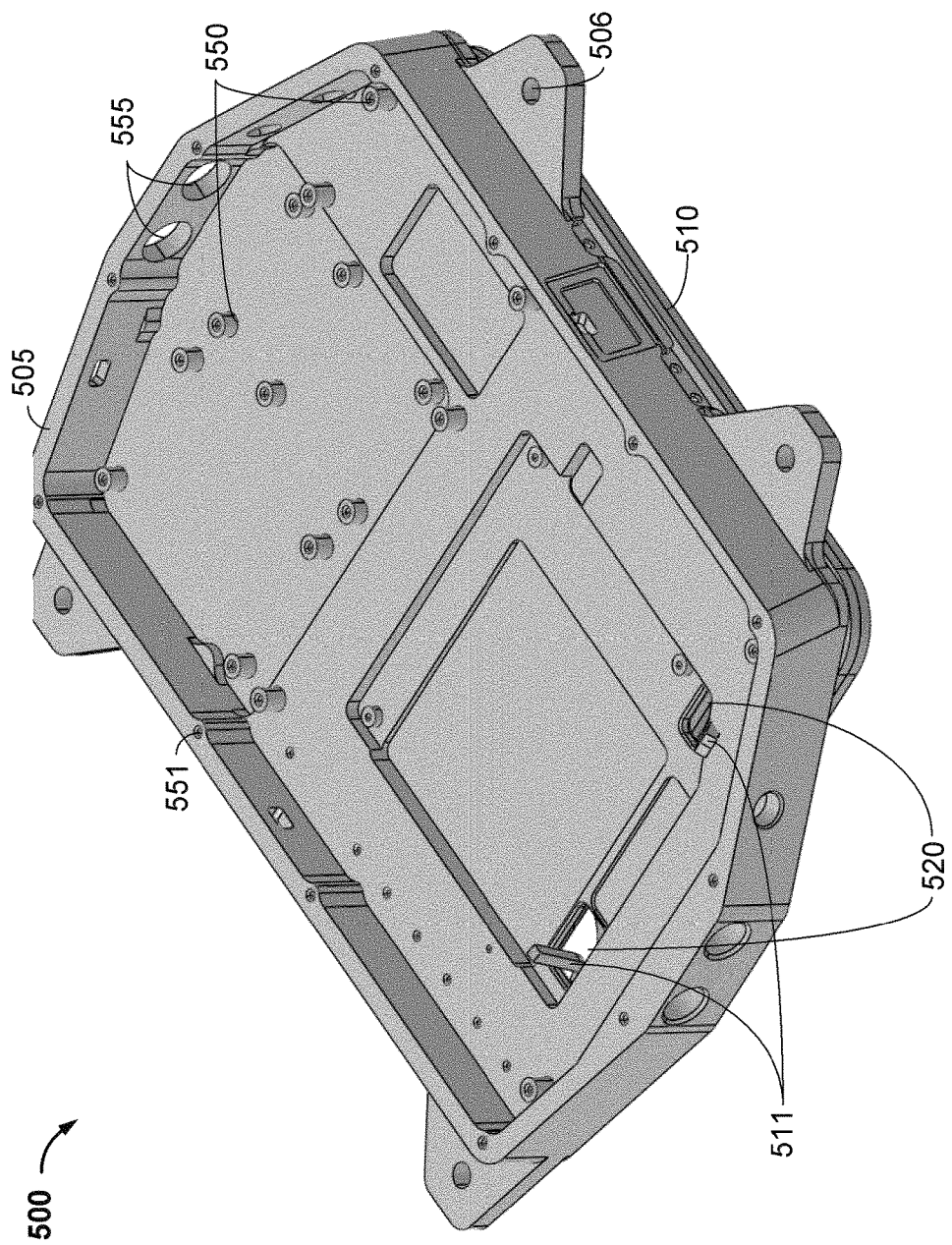
FIG. 7 is a bottom isometric view of portions of the pad of FIG. 5, in accordance with an exemplary embodiment of the present disclosure.

FIG. 7 is a bottom isometric view of portions of the pad 500, in accordance with an exemplary embodiment of the present disclosure. The pad 500 as shown includes the coil leads 511 from the coils 510 passing through the housing 505 (via the holes 520) to the PCB 507 (not shown in this figure). The housing 505 of the pad 500 as shown in FIG. 7 includes multiple mounting points 550. The housing 505 also includes multiple attachment points 551 along a rim of the housing 505. The housing 505 also includes multiple access points 555 that pass through sides of the housing 505. The housing 505 also includes the mounts 506.

The mounting points 550 may comprise one or more locations at which the PCB 507 or one or more of the electronics of the pad 500 may be mounted or attached to the housing 505. The attachment points 551 may provide locations for attaching a cover, lid, or similar enclosure piece (not shown in this figure) that generally or substantially seals or encloses the housing 505. The access points 555 may provide which the pad 500 may be coupled with external components or circuits. In some implementations, the access points 555 may provide paths for conductors or cables that electrically couple the pad 500 to the external components or circuits. In some implementations, the access points 555 may provide attachment locations for physical couplings that may secure the pad 500 to the external components.

As described above, the housing 505 may serve to protect the PCB 507 and associated electronics from environmental aspects. Additionally, the housing 505, when constructed from a conductive material, may serve as a shield against interference from the coils 510 and also protect the coils from interference generated within the housing. Thus, the housing 505 may act as a shield.

Figure 8:
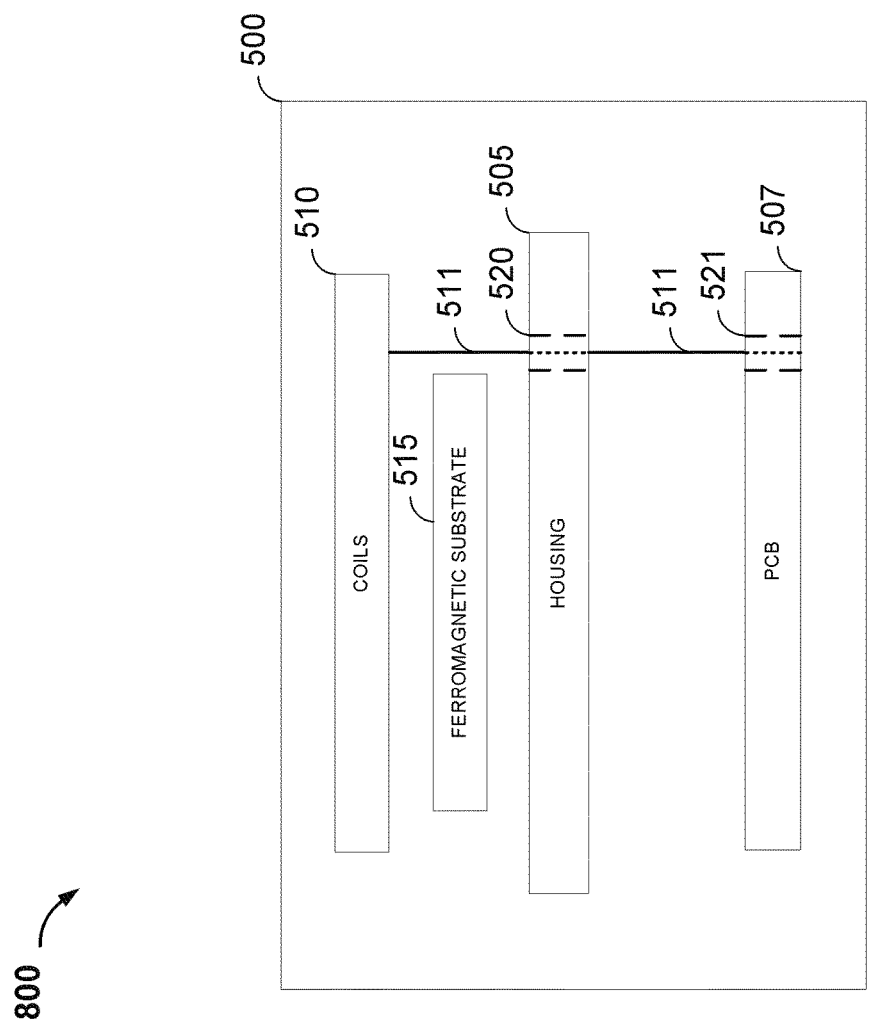
FIG. 8 is a block diagram of the pad of FIG. 5, in accordance with an exemplary implementation of the present disclosure.

FIG. 8 is a block diagram 800 of the pad 500 of FIG. 5, in accordance with an exemplary implementation of the present disclosure. Specifically, the block diagram 800 presents a simplified view of a cross-section of the pad 500 showing only the coils 510, the coil leads 511, the ferromagnetic substrate 515, the housing 505, including the holes 520, and the PCB 507, including the holes 521. As shown, the coil leads 511 pass from the coils 510 to and through the housing 505 via the holes 521 without passing through the ferromagnetic substrate 515. The coil leads 511 continue from the holes 520 in the housing 505 to and through the PCB 507 via the holes 521, where the coil leads 511 may couple to one or more of the electronics disposed on a bottom side of the PCB 507 (not shown in this figure).

Figure 9:
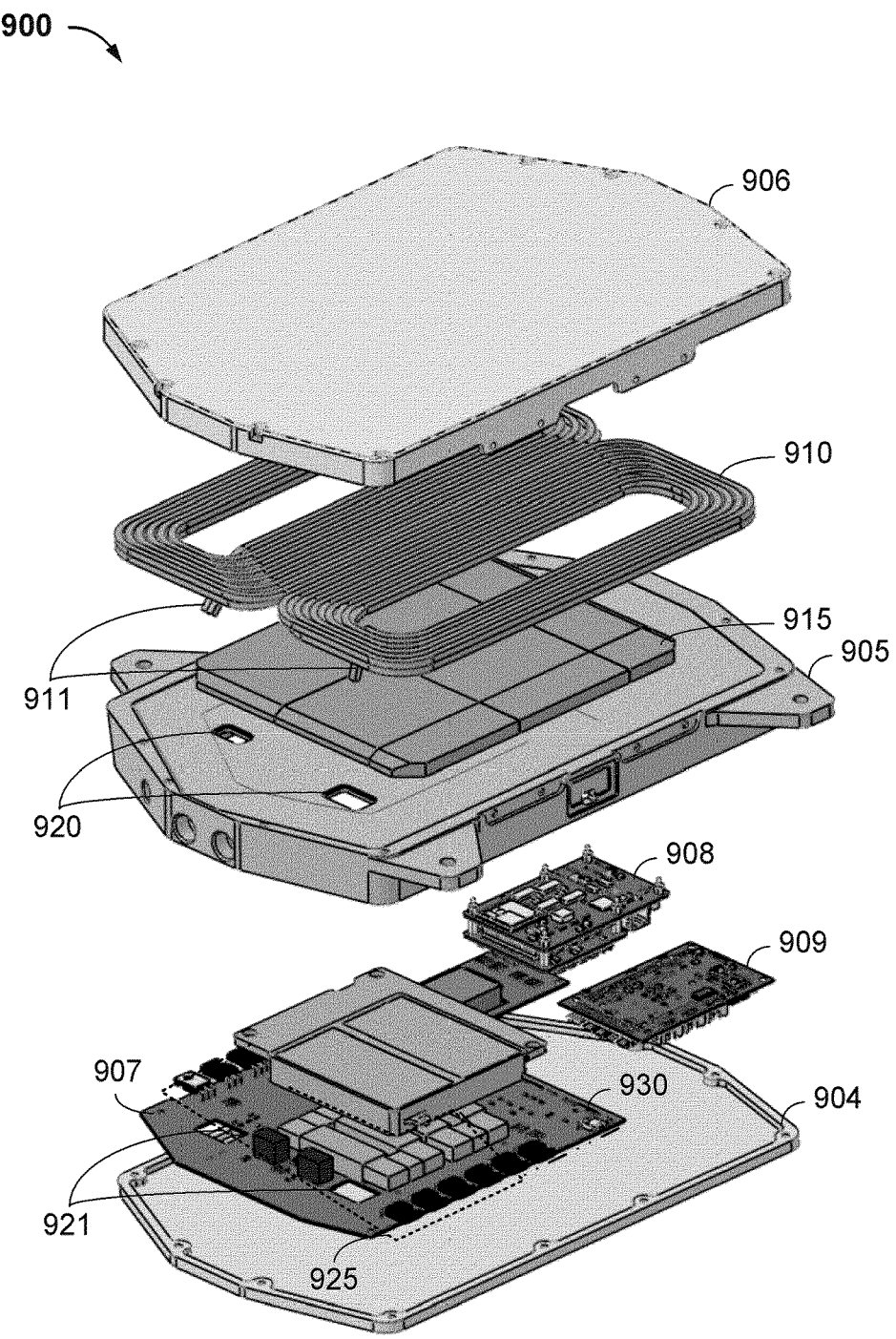
FIG. 9 is an exploded view of another wireless transfer pad 900 in accordance with an exemplary embodiment of the present disclosure.

FIG. 9 is an exploded view of another wireless transfer pad 900 in accordance with an exemplary embodiment of the invention. The pad 900 includes an upper casing 906, coils 910, a ferromagnetic substrate 915, a housing 905, low voltage modules 908 and 909, a PCB 907, and a lower casing 904. The coils 910, the ferromagnetic substrate 915, the housing 905, and the PCB 907 may correspond to the coils 510, the ferromagnetic substrate 515, the housing 505, and the PCB 507 of FIGS. 5 and 6, respectively.

The upper casing 906 is disposed above the coils 910 (arranged in a double-D arrangement), the ferromagnetic substrate 915, and the housing 905. The upper casing 906 may include a lip that engages with the housing 905 to form a sealed and/or physical barrier around the coils 910 and the ferromagnetic substrate 915. One or more of the coils 910 and the ferromagnetic substrate 915 may be coupled to one of the housing 905 and the upper casing 906 via one or more attachment points (not shown).

The housing 905 may include a lip that engages with the lower casing 904 disposed below the PCB 907, the low voltage modules 908 and 909, and the housing 905. Together, the housing 905 and the lower casing 904 may house the PCB 907, the low voltage modules 908 and 909, and any associated electronics. One or more of the PCB 907 and the low voltage modules 908 and 909 may be coupled to one of the housing 905 and the lower casing 904 via one or more attachment points (not shown).

The upper casing 906 may function in conjunction with the lower casing 904 and/or the housing 905 to protect the various components of the pad 900 from a variety of external conditions or objects, including, but not limited to, environmental aspects, weather, foreign objects, animal interference, and human interference. Additionally, one or more of the housing 905 and the lower casing 904 may provide an electromagnetic field (EMF) or electromagnetic shielding. Such a configuration may provide the benefit of preventing EMFs created by the pad 900 from affecting the internal components of the pad 900 and people, devices, and/or objects below the pad 900. Such a configuration may also prevent influence of the internal components of the pad 900 by external fields.

The coils 910 include coil leads 911, similar to the coil leads 511 of FIG. 5. The coil leads 911 may pass through two holes or orifices 920 disposed along an edge of the housing 905 that pass through the housing 905 (e.g., penetrate through the housing 905 from a top surface to a bottom surface). In passing through the edge of the pad 900, the coil leads 911 do not pass through the ferromagnetic substrate 915, similar to the structure shown and described in relation to the pad 500 of FIG. 5. As discussed herein, various benefits may be achieved by not passing the coil leads 911 through the ferromagnetic substrate 915. For example, by not passing the coil leads 911 through the ferromagnetic substrate, holes in the ferromagnetic substrate 915 and/or the path for the coil leads 911 between two separate pieces of the ferromagnetic substrate (as seen in the pad 400), and associated issues, are eliminated.

The coil leads 911 may further pass through the PCB 907 via two holes or orifices 921 disposed along an edge of the PCB 907. The coils leads 911 may couple to a bottom side of the PCB 907 within a high voltage region 925 of the PCB 907. The PCB 907 may be separated into the high voltage region 925 and low voltage region 930, as described in relation to the PCB 507. For example, the low voltage modules 908 and 909 may be disposed within or along the low voltage region 930 of the PCB 907 along an edge of the PCB 907 opposite the edge nearest the holes 921 and the coil leads 911. As described above in relation to the coil leads 511 of FIG. 5, the coil leads 911 may convey high voltage signals induced in the coils 910 to the PCB 907. The separation of the high voltage region 925 and the low voltage region 930 of the PCB 907 may, for example, reduce a likelihood of interference from the coil leads 911 in the high voltage region 925 affecting the low voltage modules 908 and 909 in the low voltage region 930. Additional benefits may be realized from such separation, as described herein. For example, such separation may provide for asymmetric coil design and "one box" solutions for wireless power transfer pads, where power electronics and coupling elements may be integrated into a single package. Additionally, manufacturing benefits may be realized in simplified processes and reduced material handling (e.g., single ferromagnetic substrate pieces and reduced coil lead lengths since the coil leads run substantially perpendicular through the pad).

Figure 10:
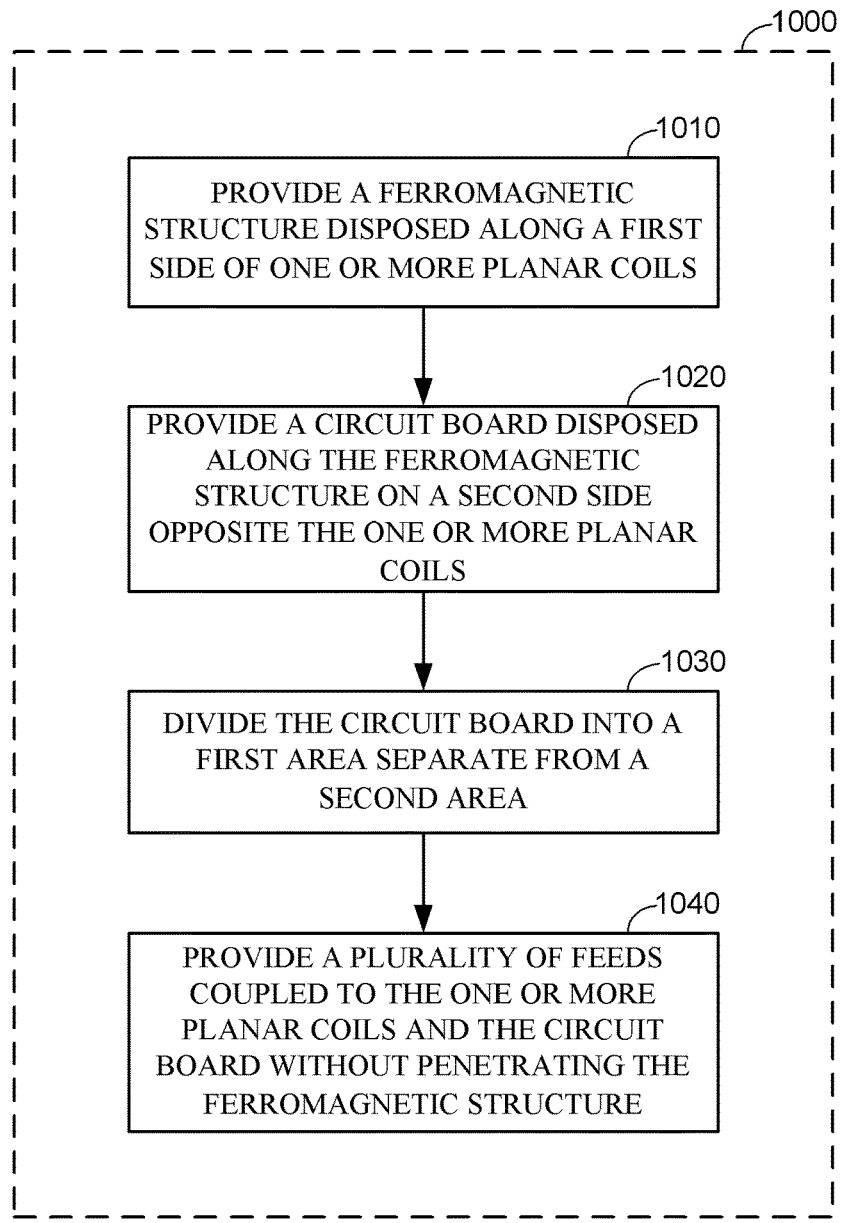
FIG. 10 is a flowchart of a method of manufacturing the pad of FIG. 5, in accordance with an exemplary implementation of the present disclosure.

FIG. 10 is a flowchart of a method of manufacturing 1000 the pad 500 of FIG. 5, in accordance with an exemplary implementation of the present disclosure. The method of manufacturing 1000 the pad 500 may include, at block 1010, providing a ferromagnetic structure (e.g., the ferromagnetic substrate 515 of FIG. 5) disposed along a first side of one or more planar coils (e.g., the coils 510 of FIG. 5). In some implementations, the ferromagnetic structure may be in contact with the coils. In some implementations, the ferromagnetic structure and the coils may be separated by one or more protective layers or materials.

The method of manufacturing 1000 further includes, at block 1020, providing a circuit board (e.g., the PCB 507 of FIG. 5) disposed along the ferromagnetic structure on a second side opposite the one or more planar coils. In some implementations, the circuit board may be separated from the ferromagnetic structure by a housing (e.g., the housing 505). In some implementations, the ferromagnetic structure and the circuit board may be in direct contact.

The method of manufacturing 1000 further includes, at block 1030, dividing the circuit board into a first area (e.g., the low voltage region 530 of FIG. 5) separate from a second area (e.g., the high voltage region 525 of FIG. 5). The first area may have an arrangement of first voltage components (e.g., the low voltage components) and the second area may have an arrangement of second voltage components (e.g., the high voltage components). The first voltage components may operate operating at a lower voltage than the second voltage components.

The method of manufacturing 1000 further includes, at block 1040, providing a plurality of feeds (e.g., coil leads 511 of FIG. 5) coupled to the one or more planar coils and the circuit board without penetrating the ferromagnetic structure. The plurality of feeds may penetrate the circuit board within the second area and couple to one or more of the second voltage components. According to the method of manufacture 1000, the pad 500 may be generated and configured to function as described herein.

An apparatus for conveying wireless power may perform one or more of the functions described herein. The apparatus may comprise one or more means for conveying wireless power. In certain implementations, the one or more means for conveying wireless power can be implemented by the transmit antenna 204 (FIG. 2), the receive antenna 216 (FIG. 2), the transmit antenna 304 (FIG. 3), the receive antenna 316 (FIG. 3), or the coils 410 (FIG. 4), 510 (FIG. 5), or 910 (FIG. 9). In some implementations, the one or more means for conveying wireless power can be configured to transmit or receive power. The apparatus may further comprise means for supporting a circuit disposed along the one or more means for conveying energy. The means for supporting a circuit may be divided into a first area separate from a second area, the first area having a plurality of first voltage components and the second area having a plurality of second voltage components, the first voltage components operating at a lower voltage than the second voltage components. In certain implementations, the means for supporting a circuit can be implemented by the PCB 507 (FIG. 5) or the PCB 907 (FIG. 9). In certain implementations, the means for supporting a circuit can be configured to house or support the various electronic components of a wireless power transfer pad. The apparatus may further comprise a plurality of means for conveying power coupled to the one or more means for conveying power and the means for supporting a circuit. The plurality of means for conveying power may pass through the means for supporting a circuit within the second area along a side of the means for supporting a circuit and coupled to one or more of the second voltage components. In certain implementations, the plurality of means for conveying power can be implemented by the leads 411 (FIG. 4), 511 (FIG. 5), or 911 (FIG. 9). In certain implementations, the plurality of means for conveying power can convey power from the means for conveying wireless power to the components on the means for supporting a circuit.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the present disclosure.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features of the present disclosure have been described herein. It is to be understood that not necessarily all such advantages may be achieved in accordance with any particular embodiment of the present disclosure. Thus, the present disclosure may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the present disclosure. Thus, the present disclosure is not intended to be limited to the embodiments shown herein but is to be accorded the widest scope consistent with the principles and novel features disclosed herein.

What is claimed is:

1. An apparatus for conveying wireless power, comprising:
   a circuit board disposed along one or more planar coils, the circuit board divided into a first area separate from a second area, the first area having a plurality of first voltage components and the second area having only a plurality of second voltage components, the first voltage components operating at a lower voltage than the second voltage components; and
   a plurality of feeds coupled to the one or more planar coils and the circuit board, the plurality of feeds passing through the circuit board within only the second area along a side of the circuit board and coupled to one or more of the second voltage components.

2. The apparatus of claim 1, wherein the plurality of feeds are configured to convey a voltage signal from the one or more planar coils to the plurality of second voltage components and wherein a space between a position of the second area and a position of the first area reduces an interference of the first voltage components by the voltage signal.

3. The apparatus of claim 1, further comprising one or more conductors arranged in the one or more planar coils, wherein the plurality of feeds run substantially perpendicular to both the one or more planar coils and the circuit board.

4. The apparatus of claim 1, further comprising a housing disposed along the one or more planar coils and between the one or more planar coils and the circuit board.

5. The apparatus of claim 4, wherein the housing is configured to protect the circuit board and the first and second voltage components from environmental exposure and impacts.

6. The apparatus of claim 4, wherein the housing defines a first plurality of holes extending from a first surface to a second surface of, and through the housing, the first surface opposite the second surface, wherein the circuit board defines a second plurality of holes extending from a first surface to a second surface of, and through the circuit board, the first surface opposite the second surface, and wherein the plurality of feeds penetrates the housing via the first plurality of holes and penetrates the circuit board via the second plurality of holes when coupling the one or more coils to the one or more high voltage components.

7. The apparatus of claim 1, wherein the one or more planar coils are configured to generate a wireless field and transfer power wirelessly to one or more wireless power receivers via the magnetic field.

8. The apparatus of claim 1, wherein the one or more planar coils are configured to generate an induced voltage based on exposure to a wireless field generated by a wireless power transmitter.

9. The apparatus of claim 1, further comprising a ferromagnetic structure disposed along a first side of the one or more planar coils, wherein the plurality of feeds is coupled to the circuit board and the one or more planar coils without penetrating the ferromagnetic structure.

10. A method of manufacturing an apparatus for wirelessly conveying power, the method comprising:
   providing a ferromagnetic structure disposed along a first side of one or more planar coils;
   providing a circuit board disposed along the ferromagnetic structure on a second side opposite the one or more planar coils;
   dividing the circuit board into a first area separate from a second area, the first area having an arrangement of first voltage components and the second area having an arrangement of only second voltage components, the first voltage components operating at a lower voltage than the second voltage components; and providing a plurality of feeds coupled to the one or more planar coils and the circuit board without penetrating the ferromagnetic structure, wherein the plurality of feeds penetrate the circuit board within only the second area and couple to one or more of the second voltage components.

11. The method of claim 10, wherein the plurality of feeds are configured to convey a voltage signal from the one or more planar coils to the plurality of second voltage components and wherein a space between a position of the second area and a position of the first area reduces an interference of the first voltage components by the voltage signal.

12. The method of claim 10, wherein the one or more planar coils comprise one or more conductors and wherein the plurality of feeds runs substantially perpendicular to both the one or more planar coils and the circuit board.

13. The method of claim 10, further comprising providing a housing along the one or more planar coils and between the one or more planar coils and the circuit board.

14. The method of claim 13, wherein the housing is configured to protect the circuit board and the first and second voltage components from environmental exposure and impacts.

15. The method of claim 13, wherein the housing defines a first plurality of holes extending from a first surface to a second surface of, and through the housing, the first surface opposite the second surface, wherein the circuit board defines a second plurality of holes extending from a first surface to a second surface of, and through the circuit board, the first surface opposite the second surface, and wherein the plurality of feeds penetrates the housing via the first plurality of holes and penetrates the circuit board via the second plurality of holes when coupling the one or more coils to the one or more high voltage components.

16. The method of claim 10, wherein the one or more planar coils are configured to generate a wireless field and transfer power wirelessly to one or more wireless power receivers via the magnetic field.

17. The method of claim 10, wherein the one or more planar coils are configured to generate an induced voltage based on exposure to a wireless field generated by a wireless power transmitter.

18. The method of claim 10, further comprising providing a ferromagnetic structure along a first side of the one or more planar coils, wherein the plurality of feeds is coupled to the circuit hoard and the one or more planar coils without penetrating the ferromagnetic structure.

19. An apparatus for conveying wireless power, comprising:
one or more means for conveying wireless power;
means for supporting a circuit disposed along the one or more means for conveying energy, the means for supporting a circuit divided into a first area separate from a second area, the first area having a plurality of first voltage components and the second area having only a plurality of second voltage components, the first voltage components operating at a lower voltage than the second voltage components; and
a plurality of means for conveying power coupled to the one or more means for conveying power and the means for supporting a circuit, the plurality of means for conveying power passing through the means for supporting a circuit within only the second area along a side of the means for supporting a circuit and coupled to one or more of the second voltage components.

20. The apparatus of claim 19, wherein the plurality of means for conveying power are configured to convey a voltage signal from the one or more means for conveying wireless power to the plurality of second voltage components and wherein a space between a position of the second area and a position of the first area reduces an interference of the first voltage components by the voltage signal.

21. The apparatus of claim 19, further comprising one or more conductors arranged in the one or more means for conveying wireless power, wherein the plurality of feeds run substantially perpendicular to both the one or more means for conveying wireless power and the means for supporting a circuit.

22. The apparatus of claim 19, further comprising a housing disposed along the ferromagnetic structure on a side opposite the one or more planar coils and between the ferromagnetic structure and the means for supporting a circuit.

23. The apparatus of claim 22, wherein the housing is configured to protect the means for supporting a circuit and the first and second voltage components from environmental exposure and impacts.

24. The apparatus of claim 22, wherein the housing defines a first plurality of holes extending from a first surface to a second surface of, and through the housing, the first surface opposite the second surface, wherein the means for supporting a circuit defines a second plurality of holes extending from a first surface to a second surface of, and through the means for supporting a circuit, the first surface opposite the second surface, and wherein the plurality of feeds penetrates the housing via the first plurality of holes and penetrates the means for supporting a circuit via the second plurality of holes when coupling the one or more coils to the one or more high voltage components.

25. The apparatus of claim 19, wherein the one or more means for conveying wireless power are configured to generate a wireless field and transfer power wirelessly to one or more wireless power receivers via the magnetic field.

26. The apparatus of claim 19, wherein the one or more means for conveying wireless power are configured to generate an induced voltage based on exposure to a wireless field generated by a wireless power transmitter.

27. The apparatus of claim 19, further comprising a ferromagnetic structure disposed along a first side of the one or more means for conveying wireless power, wherein the plurality of means for conveying power is coupled to the means for supporting a circuit and the one or more means for conveying wireless power without penetrating the ferromagnetic structure.

* * * * *